United States Patent
van den Berg (10) Patent No.: US 7,100,534 B2
(45) Date of Patent: Sep. 5, 2006

(54) FEED METERING AND ANIMAL IDENTIFICATION DEVICE HAVING ANGULARLY DISPLACEABLE WEIGHING MEANS

(75) Inventor: Karel van den Berg, Bleskensgraaf (NL)

(73) Assignee: Lely Research Holding A.G., Zug (CH)

( * ) Notice: Subject to any disclaimer, the term of this patent is extended or adjusted under 35 U.S.C. 154(b) by 0 days.

(21) Appl. No.: 09/828,358

(22) Filed: Apr. 9, 2001

(65) Prior Publication Data

US 2002/0007799 A1 Jan. 24, 2002

(30) Foreign Application Priority Data

Apr. 10, 2000 (NL) .............................. 1014895

(51) Int. Cl.
*A01K 5/02* (2006.01)

(52) U.S. Cl. .................... 119/53; 119/51.02; 119/63
(58) Field of Classification Search ............. 119/51.02, 119/53, 56.1, 62, 63, 81, 511, 521
See application file for complete search history.

(56) References Cited

U.S. PATENT DOCUMENTS

| | | | | |
|---|---|---|---|---|
| 3,532,076 A | * | 10/1970 | Parker ......................... | 119/81 |
| 4,461,241 A | * | 7/1984 | Ostler ...................... | 119/51.02 |
| 4,475,481 A | * | 10/1984 | Carroll ..................... | 119/51.02 |
| 4,655,170 A | * | 4/1987 | DaSilva .................... | 119/51.02 |
| 4,934,317 A | * | 6/1990 | Pourshalchi ................ | 119/165 |
| 5,050,537 A | * | 9/1991 | Fox .......................... | 119/51.02 |
| 5,255,631 A | * | 10/1993 | Anderson ................... | 119/52.2 |
| 6,349,671 B1 | * | 2/2002 | Lewis et al. .............. | 119/51.02 |
| 6,371,047 B1 | * | 4/2002 | van den Berg .......... | 119/51.02 |

FOREIGN PATENT DOCUMENTS

| | | | |
|---|---|---|---|
| EP | 0610171 A2 | * | 2/1994 |
| EP | 94890029.5 | | 8/1994 |
| EP | 94202168.4 | | 2/1995 |
| FR | 2671940 | * | 1/1991 |
| NL | 9201487 | | 3/1994 |
| NL | 1002399 | | 10/1997 |
| WO | WO 95/23503 | | 2/1995 |
| WO | WO 96/05723 | | 2/1996 |

* cited by examiner

*Primary Examiner*—Charles T. Jordan
*Assistant Examiner*—Kimberly S. Smith
(74) *Attorney, Agent, or Firm*—Penrose Lucas Albright (57) ABSTRACT

A feed metering device for distributing fodder or drink or both as feed to animals in metered portions. The metering device is provided with a feed unit for containing the feed. An entrance door provides access to the feed unit. A feed supplying device supplies a predetermined amount of feed to the feed unit for the animal which is to be fed at the feed unit as determined by an animal identification device which is disposed at the feed unit and detects an identifying transponder on the relevant animal. The feed unit and therefore the feed therein is measured by its angular displacement relative to the device otherwise. Specifically, rolls are provided to measure the amount of pivoting or rotation relative to the device otherwise. The device also includes deterrence elements such as a loudspeaker or a light or an electrical current in lieu of or in additions to the entrance door to deter animals from attempting to consume feed at the feed unit when it is undesirable that the particular animal be permitted to consume feed at the feed unit.

44 Claims, 5 Drawing Sheets

FEED METERING AND ANIMAL IDENTIFICATION DEVICE HAVING ANGULARLY DISPLACEABLE WEIGHING MEANS

FIELD OF INVENTION

The present invention relates to a feed metering device for distributing fodder or drink or both in metered portions to an animal, which feed metering device is provided with a feed unit for receiving fodder or drink or both, an entrance opening to the feed unit, and a feed supplying device for supplying a controlled amount of fodder or drink or both to the feed unit. Such a feed unit may include an manger or feeding trough, or a unit provided with a nipple such as may be provided for calves.

BACKGROUND OF THE INVENTION

Such feed metering devices, for cows, for example, are generally known. However, a disadvantage of known feed metering devices is that ascertaining whether fodder or drink or both remain in the feed unit after an animal has visited same can only be determined in a cumbersome manner. Such a determination of the remnants may inter alia be an indication of the health condition of the animal; for, when an animal unexpectedly takes a smaller amount of fodder or drink or both, this may indicate that the animal is ill. Moreover, it is undesirable that, when an animal leaves a certain amount of fodder or drink or both in the feed unit, such remnants will be available for the next animal without being taken into account.

SUMMARY OF THE INVENTION

In view of the foregoing, it is one of the objectives of the present invention to provide a feed metering device for distributing fodder or drink or both in metered portions to an animal, by means of which the amount of fodder and or drink or both which may be left in the feed unit for the next animal can be determined in a simple but reliable manner.

For that purpose, in accordance with the invention, a feed metering device of the above described type is characterized in that the feed metering device is provided with means for weighing the fodder or drink or both, present in the feed unit, by the feed unit being fastened pivotably or rotatably or by a combination thereof to the feed metering device for the purpose of co-operating with the weighing means. Thus it is possible to determine how much fodder or drink, or both, is consumed by a particular animal. On the basis thereof the amount of fodder or drink or both consumed by an animal can be determined over a course of time and accordingly the health condition of an animal can be deduced.

Preferably the feed metering device according to the invention is further provided with an animal identification device for recognizing a particular animal that the feed unit. In this situation by an "animal that visits the feed unit" is meant an animal that can be provided fodder or drink, or both, by the device. Thus the conditions are such that it is possible for the feed supplying device to supply a predetermined amount of feed to the feed unit with the aid of data from the animal identification device;

The means for weighing the fodder or drink, or both, present in the feed unit are preferably connected to the feed supplying unit for supplying an amount of fodder or drink, or both, to the feed unit based on data both from the animal identification device and the weighing means.

The means for weighing the fodder or drink, or both, present in the feed unit may comprise a feed unit which is pivotable about a hinge pin, the degree of pivotability, that is the angular displacement of the feed unit, being determined by the weight of the fodder or drink, or both, present in the feed unit, and a device for determining the degree of pivotability of the feed unit and also for deducing, from the degree as so determined, the weight of the fodder or drink, or both, present in the feed unit. The degree of pivotability of the feed unit thus depends on the amount of fodder or drink, or both, in the feed unit. The more fodder or drink, or both, the more the unit pivots. The exact correlation between the degree of pivotability and the amount of fodder or drink, or both, can previously be determined by means of simple calibration tests.

A compact construction of the feed metering device obtained when the device for determining the degree of pivoting of the feed unit and the deducing, from the degree as so determined, the weight of the fodder or drink, or both, present in the feed unit, is integrated in the animal identification device.

When the device for determining the degree of pivoting of the feed unit and for deducing, from the degree as so determined, the weight of the fodder or drink, or both, present in the feed unit comprises a measuring roll which is in contact with the feed unit from this it is possible to determine from the degree of rotation of the roll the degree of pivoting and thus the amount of fodder or drink, or both, in the feed unit.

Alternatively or additionally, a device for determining the degree of pivoting of the feed unit and for deducing, from the degree as so determined, the weight of the fodder or drink, or both, present in the feed unit, may include a load sensor, the feed unit bearing on the load sensor. The load sensor is thus preferably included in the animal identification device.

In order to be able to measure even a small difference in weight, in a preferred embodiment of a feed metering device according to the invention, the hinge pin on one hand and the load sensor or the measuring roll, or both, on the other hand, are located at a small distance or distances from each other.

In order to prevent for example the load sensor from being damaged in the event of a defect, a safety supporting bracket is provided for the feed unit.

A preferred embodiment of a feed metering deivice according to the invention is characterized in that the means for weighing the fodder or drink, or both, present in the feed unit comprises a movable feed unit, a motor for moving the feed unit, a device for measuring the resulting magnitude of the torque which is developed during movement, and for deducing, from the magnitude of the torque so measured, the weight of the fodder or drink, or both present in the feed unit. The magnitude of the torque generated by the movement of the feed unit depends on the amount of fodder or drink, or both, in the feed unit. Also in this situation, an exact correlation between torque and amount of fodder or drink, or both, can previously be determined by means of simple calibration tests.

A compact feed metering device is obtained when the motor for moving the feed unit and the device for measuring the magnitude of the torque during movement and for deducing, from the magnitude of the torque measured, the weight of the fodder or drink, or both, present in the feed unit, are integrated with the animal identification device.

A mechanically simple but accurate construction is obtained when the motor for moving the feed unit drives a torque roll, said torque roll being in contact with the feed unit.

A preferred embodiment of a feed metering device according to the invention is characterized is that the feed metering device is provided with means for deterring an animal that wishes to use the feed unit. Because the animal identification device is able to recognize a particular animal, said device is particularly appropriate for being used to deter an animal that wishes to use the feed unit at an inappropriate point of time by correctly controlling deterring means. A disadvantage of the known feed metering device is that an animal quickly learns where the fodder or drink, or both, can be obtained, and regularly goes to the feed metering device and puts its head into the feed unit, even when it has recently received its ration of fodder or drink, or both. This disturbs the feeding of the other animals. Animals that are not eligible for visiting the feed unit are usually chased away manually, which is time-consuming and labor-intensive. Alternatively, the use of entrance gates that regulate the flow of animals towards the feed metering device is known. However, these entrances gates are expensive and do not adequately promote the desired movements of the animals; moreover, entrance gates are regularly damaged because the animals lean against them with their full weight. Sometimes the entrance gates even cause the animals to be injured. The preferred embodiment of the feed metering device with deterring means offers a satisfactory solution to these problems.

The feed metering device may be extremely compact when the means for deterring an animal are at least partially integrated in the animal identification device. Alternatively, the means for deterring an animal may be constituted by separate means.

Preferably the means for deterring an animal utilize data from the animal identification device.

The means for deterring an animal preferably includes a loudspeaker for producing sounds which afright the animals involved. Certain animals are highly sensitive to certain sounds, so that a loudspeaker is very appropriate for deterring such animals. Moreover, such a loudspeaker may be used for producing calming or stimulating sounds when an animal uses the feed metering device correctly.

Alternatively or additionally, the means for deterring an animal may include a lighting device for emitting an animal-frightening light. In particular when a plurality of feed metering devices are disposed side by side, the use of frightening light is desirable, as the light can be directed in such a manner that its effect is limited to one particular feed metering device.

The means for deterring an animal may include a voltage emitting device for emitting an animal-frightening electric voltage. Sound and light have proved to be effective for deterring unwanted animals, but have the disadvantage of being observable at greater distances from the relevant feed metering device. Animals that undesirably visit a feed metering device often make contact with the feed metering device, usually with their noses. By linking with a voltage emitting device precisely those components of the feed metering device that are regularly touched by the animals, it is possible to deter a particular animal very locally.

If, in spite of the deterring means, an animal attempts to use the feed unit, a preferred embodiment of a feed metering device according to the invention is characterized in that the means for deterring an animal includes a closing means that is movable across the entrance opening of the feed unit. In this matter the contents of the feed unit are made inaccessible to a particular animal.

The closing means may be formed by a separate component, but is preferably constituted by the feed unit itself, which is designed as a movable one. As a result thereof the number of components is limited and the feed metering device can be manufactured more economically.

In order to prevent fodder or drink, or both, from falling from the feed unit in certain positions of the feed unit, the latter comprises a wall portion for catching such feed. Said wall portion can also function as a feed guide means for fodder or drink, or both, that is supplied by the feed supplying device to the feed unit.

According to an embodiment of deterring means for a feed metering device in accordance with the invention, a simple but reliable embodiment of such deterring means is characterized in that the closing means rotates about an axis, the closing means being driven by a motor that is controlled by the animal identification device. The motor preferably drives a roll which contacts the closing means. An extremely compact construction is obtained when the motor and the roll are included in the animal identification device or when the feed unit bears on the animal identification device by means of the roll, or when such arrangements are combined.

According to the invention, the means for deterring an unwanted animal and the means for measuring the amount of fodder or drink, or both, in the feed unit can be combined so that the roll for driving the feed unit to function as a closing means and the torque roll used for measuring the torque comprise one roll.

In order to be able accurately to perform animal identification and to obtain at the same time a compact construction, a feed metering unit according to the present invention is characterized in that the animal identification device is disposed in the vicinity of a location below the entrance opening.

According to the invention, the means for deterring an animal are at least partially integrated in the means for weighing the fodder or drink, or both, present in the feed unit.

BRIEF DESCRIPTION OF THE DRAWINGS

The invention will be explained hereinafter in further detail with reference, by way of example, to the drawing in which.

DETAILED DESCRIPTION OF THE PREFERRED EMBODIMENTS

Figure 1:
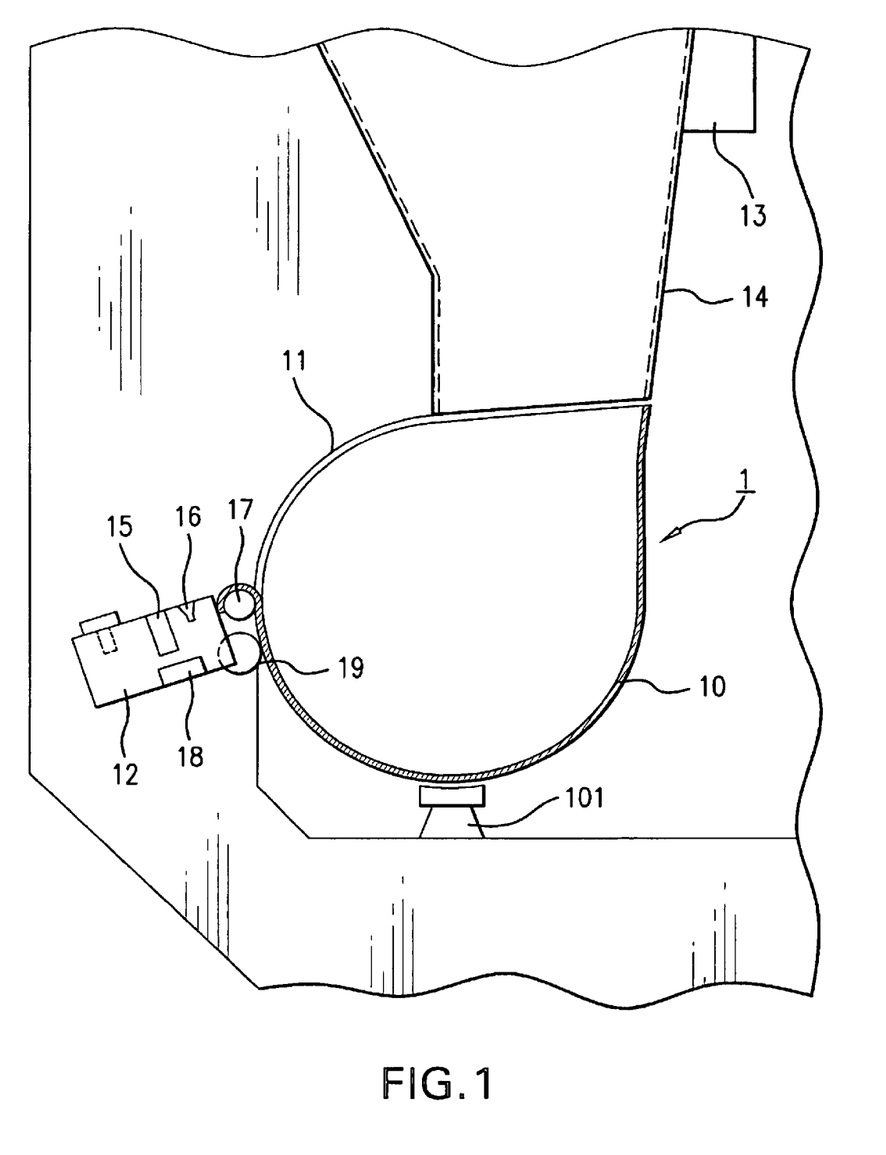
FIG. 1 is a schematic side elevational view in partial section of a first embodiment of the feed metering device according to the invention.

FIG. 1 shows schematically a first embodiment of a feed metering device 1 according to the invention. Feed metering device 1 distributes fodder or drink, or both, which for the sake of simplicity will hereinafter be denoted as "feed", although it will be clear that fodder or drink, or both, is meant, in metered portions to an animal, and is provided with a feed unit 10 for containing feed. An entrance opening 11 makes feed unit 10 accessible to an animal, for example but not exclusively, a cow. An animal identification device 12, known per se, is preferably disposed in feed metering device 1. Device 12 recognizes a particular animal that approaches feed unit 10 and wishes to use it. A feed supplying device 13 supplies an amount of feed to feed unit 10, with the aid of data from animal identification device 12, the feed entering feed unit 10 via a valve provided for such purpose and a chute 14.

Thus it is possible for feed metering device 1 to recognize a particular animal, such as a particular cow, for example by means of a transponder fitted to or on the cow. Feed supplying device 13 is controlled in a manner well known in the art which is controlled by software that ensures that the right amount of feed is distributed to the relevant cow.

According to the invention, the feed metering device may be provided with means for weighing the feed present in the feed unit. With the aid of said weighing means it is possible to determine how much feed is consumed by a particular animal, and at the same time whether and to what extent remaining feed is present in the feed unit. The means for weighing the feed present in the feed unit are preferably connected to the feed supplying device for supplying an amount of feed to the feed unit with the aid of data both from the animal identification device and the weighing means, so that the amount of feed left by the previous animal can be taken into account.

In the first embodiment of the feed metering device according to the invention, as schematically shown in FIG. 1, the means for weighing the feed present in feed unit 10 comprises feed unit 10, as such, which is pivotable about a hinge pin 17. The degree of pivotability is determined by the weight of the feed present in feed unit 10. A device 18 is provided for determining the degree of pivotability of feed unit 10 and for deducing therefrom the weight of the feed present in feed unit 10. Device 18 for determining the degree of pivotability of the feed unit 10, comprises a measuring roll 19 which is in contact with the feed unit. From the degree of rotation of roll 19 the degree of pivotability and thus the amount of feed in feed unit 10 can be determined.

Due to the fact that device 18 and roll 19 for determining the degree of pivotability of feed unit 10 is integrated with the animal identification device 12, a compact construction of the feed metering device is obtained. Alternatively, device 18 and roll 19 may be located outside the animal identification device.

Figure 2:
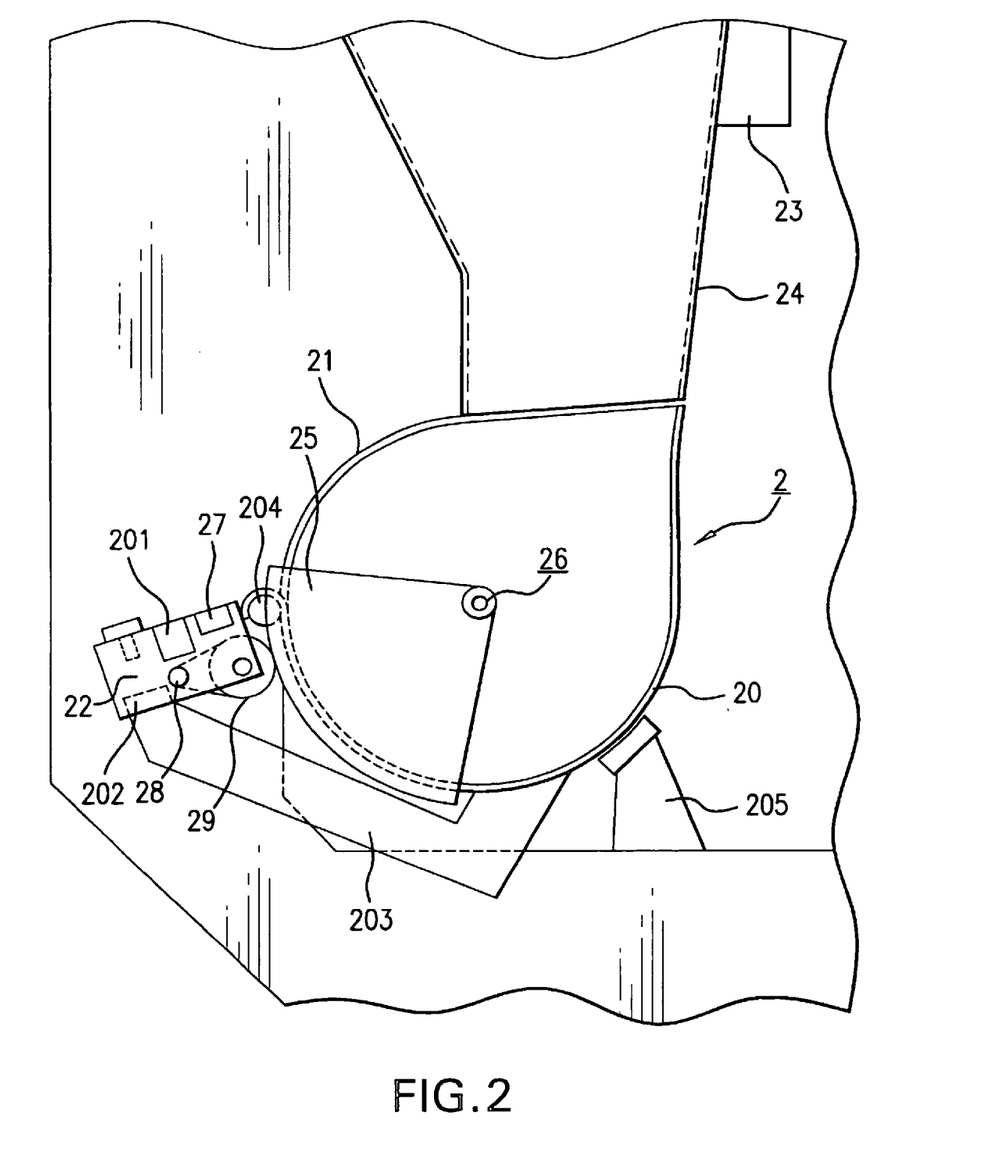
FIG. 2 is a view similar to FIG. 1 which shows a second embodiment of a feed metering according to the invention.

In the second embodiment of a feed metering device according to the invention, as shown schematically in FIG. 2, a device 201 for determining the degree of pivotability of a feed unit 20 and for deducing therefrom the weight of the feed present in the feed unit 20 may alternatively or additionally comprise a load sensor 202. In the embodiment shown, feed unit 20 bears on the load sensor 202 via a supporting arm 203. Feed unit 20 pivots about a hinge pin 204. Load sensor 202 is preferably included in the animal identification device 22.

In the embodiments shown in FIGS. 1 and 2, even small differences in weight can be measured due to the fact that hinge pins 17 and 204 and measuring roll 19 and load sensor 202, respectively, are located at small distances from each other.

In order to prevent the measuring roll, the load sensor or a similar mechanism from being damaged under the circumstances such as when an animal forcibly pushes the manger downwardly there may be provided in both embodiments safety supporting brackets 101 (FIG. 1) and 205 (FIG. 2) for supporting feed units 10 and 20 respectively.

Figure 3:
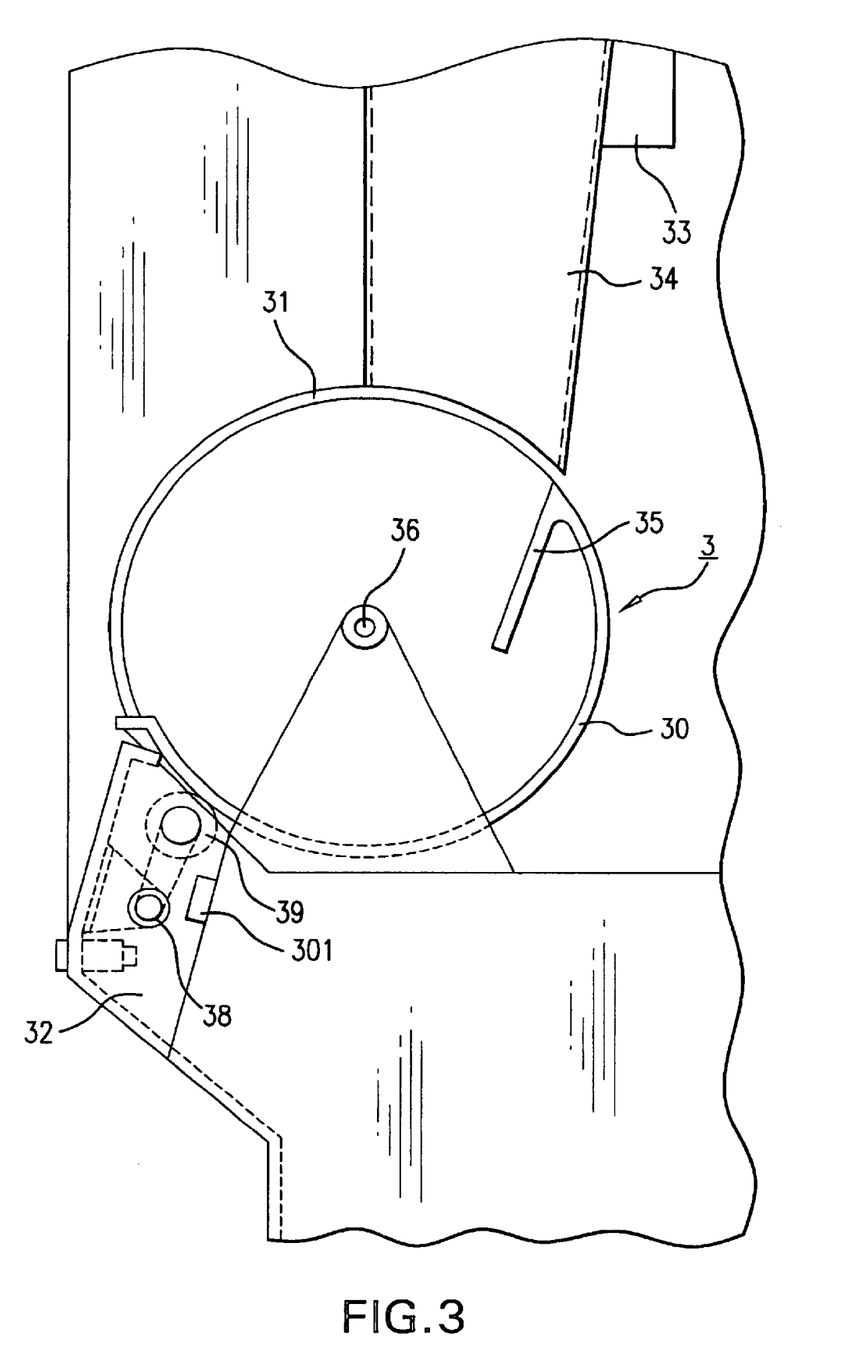
FIG. 3 is a view similar to FIGS. 1 and 2 which shows a third embodiment of a feed metering device according to the invention.

In the third embodiment of a feed metering device according to the invention, as shown schematically in FIG. 3, the means for weighing the feed present in the feed unit comprises a movable feed unit 30. Feed unit 30 is moved in a reciprocating manner by a motor 38 by which a roll 39 is driven. As a result of this movement there occurs a torque, the magnitude of which is determined by a device 301 for measuring the magnitude of the torque. Device 301 deduces the weight of the feed present in the feed unit from the determinations of torque. The exact correlation between torque and amount of feed can previously be determined by means of simple calibration tests.

The embodiment according to FIG. 3 has a compact construction due to the fact that motor 38 for moving feed unit 30 and device 301 for measuring the magnitude of the torque during movement and for deducing, from the magnitude of the torque measured, the weight of the feed present in feed unit 30, are integrated with animal identification device 32.

The feed metering device according to the invention may be provided with means for deterring an animal that wishes to use the feed unit at an undesired point of time with the aid of data from the animal identification device. This makes it possible to deter animals that are not eligible for being fed, in a simple, efficient and relatively inexpensive manner, from putting their heads into the feed unit.

In the first embodiment shown in FIG. 1, the means for deterring an animal includes a loudspeaker 16 for producing an animal-frightening sound. Alternatively or additionally, the means for deterring an animal may include a lighting device 15 for emitting an animal-frightening light. In particular when a plurality of feed metering devices are disposed side by side, the use of frightening light is desirable, as this light can be directed in such a manner that its effect is limited to one particular feed metering device.

In the second embodiment shown in FIG. 2, the means for deterring an animal includes a closing means 25 that is movable across the entrance opening 21. When closing means 25 is moved across entrance opening 21, the contents of feed unit 20 are made inaccessible to a particular animal. In the embodiment shown, closing means 25 is constituted by a vessel-like element which is capable of rotating about an axle 26. Said axle 26 may be driven by a motor, which motor is controlled with the aid of data from animal identification device 22.

Additionally, there may be provided a voltage emitting device for emitting an animal-frightening electric voltage to closing means 25. Animals that undesirably approach the feed metering device 2 will often make contact with it. In particular they will touch closing means 25 with their noses. By linking voltage emitting device 27 precisely to those components of the feed metering device that are regularly touched by the animals, it is possible to deter a particular animal locally. Thus it is also possible to use such a voltage emitting device 27 independently of a closing means. This second embodiment of a feed metering device 2 according to the invention also comprises a feed supplying device 23 and a chute 24 for the feed.

The feed metering devices described may be extremely compact in which means for deterring an animal are integrated with the animal identification device. Alternatively, the means for deterring an animal may be separate.

The third embodiment shown in FIG. 3 the closing means comprises feed unit 30 itself, which is designed as a movable one. In the embodiment shown feed unit 30 is rotatably disposed about an axis 36, which may be the axis of an axle driven by a motor, said motor being controlled by the animal identification device.

In order to prevent, in the position in which feed unit 30 closes entrance opening 31, feed from falling from feed unit 30, feed unit 30 comprises a wall portion 35 for catching remaining feed. Said wall portion 35 can also act as a feed guide means for feed that is supplied to feed unit 30 via the chute 34 of feed supplying device 33.

The second and third embodiments provide simple but reliable constructions due to the fact that their closing means rotate about axes, the closing means being rotated by a motor which is controlled by the animal identification device. Moreover, to provide, in addition to a simple but reliable construction, also a compact construction, rolls 29 and 39 are preferably driven by motors 28 and 38 respectively, wherein rolls 29 and 39 contact closing means 25 and feed unit 30, respectively. In the third embodiment feed unit 30 thus bears on animal identification device 32 via roll 39.

An extremely compact construction is obtained when motors 28 and 38 and rolls 29 and 39 are respectively included in the relevant animal identification devices 22 and 32.

Although for roll 39 a separate torque roll, may be substituted, roll 39 preferably functions as a drive of the closing means in this situation constituted by feed unit 30 itself; as well as a torque roll or a measuring roll, respectively, in the alternative case in which feed unit 30 is moved by axle 36 which is driven by a motor, the torque can also be measured, of course, via said motor.

Figure 4:
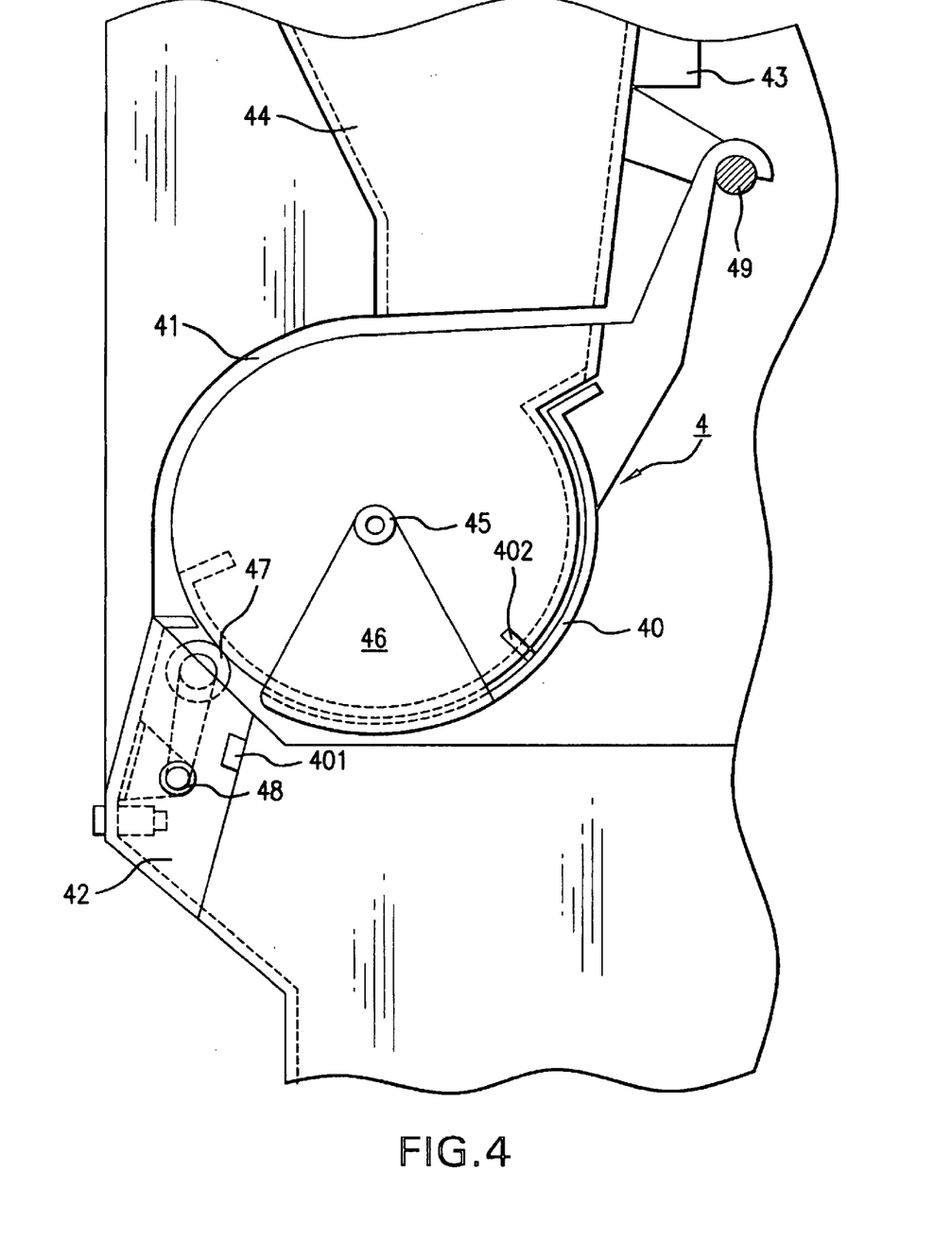
FIG. 4 is a view similar to FIGS. 1, 2 and 3 which shows a fourth embodiment of a feed metering device according to the invention.

The fourth embodiment of a feed metering device 4 according to the present embodiment, as shown in FIG. 4, comprises means for deterring an animal that wants to use the feed unit 40, with the aid of data from the animal identification device 42, as well as means for weighing the feed present in the feed unit 40.

The deterring means are constituted by a separate closing means 46 which is rotatable about an axle 45. Closing means 46 is rotated by a roll 47 which is capable of contacting closing means 46 (as will be explained hereinafter). Roll 47 is driven by a motor 48 which is controlled by animal identification device 42.

In this embodiment the weighing means are constituted by feed unit 40 which is rotatable about shaft 49. Feed unit 40 can be brought into contact with roll 47, and is subjected to a reciprocating motion by correctly controlling motor 48 that drives roll 47. By the movement of feed unit 40 a torque is generated that can be measured by a torque measuring device 401.

In the situation shown in FIG. 4, roll 47 makes contact with feed unit 40, the latter being caused to move for determining the amount of feed present in feed unit 40. After an animal has consumed the feed, the amount of remaining feed can be determined by torque measurement. Then roll 47 is controlled by motor 48 in opening 41. A catching element 402 on feed unit 40 moves closing means 46 along with it until closing member contacts roll 47. Thereafter the roll 47 controls closing means 46 in such a manner that the latter covers the entire entrance opening 41. As a result of the fact that feed unit 40 is no longer in contact with roll 47, feed unit 40 falls back to the starting position whereupon feed can be added by a feed supplying device 43 via a chute 44.

Figure 5:
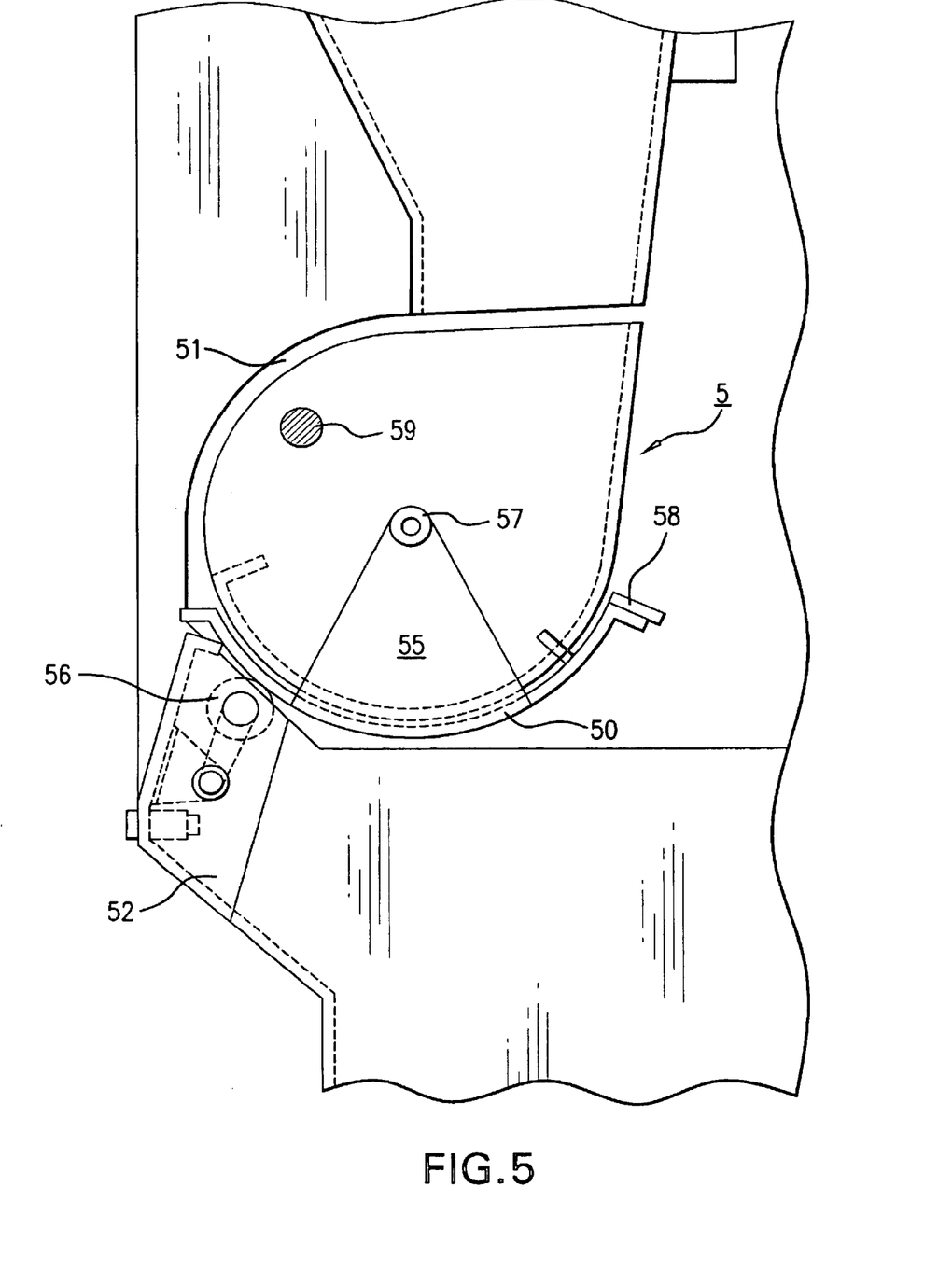
FIG. 5 is a view similar to FIGS. 1 through 4 which shows a fifth embodiment of a feed metering device according to the invention.

The fifth embodiment of a feed metering device according to the present invention, as shown in FIG. 5, differs from that of a FIG. 4 by the position of a hinge pin 59 about which the feed unit 50 rotates. Hinge pin 59 is positioned close to a roll 56 for driving feed unit 50 and measuring the torque, for measuring very small differences in the amount of feed. There is also provided a stop 58 preventing superfluous movement of feed unit 50. Closing means 55 for closing the entrance opening 51 pivots about an axle 57.

For the purpose of being able accurately to perform the animal identification functions and to obtain at the same time a compact construction, a feed metering device according to the present invention is characterized in that the animal identification device is disposed below the entrance opening or in the vicinity thereof.

Although the invention has been described on the basis of an animal identification device, 12, 22, 32, 42 and 52 which may be provided with weighing or determining means, or both, and which is relatively stationary, it is also possible to dispose the animal identification device together with a weighing or deterring means, or both, on a movable feed unit.

Although I have disclosed the preferred embodiments of my invention, it is to be understood that it is capable of other adaptions and modifications within the scope of the following claims.

What is claimed:

1. A feed metering device for providing feed in measured portions to an animal which comprises a feed unit for containing said feed, an entrance opening to said feed unit, a feed supplying device for providing feed to said feed unit, weighing means for weighing the feed in said feed unit, said feed unit being connected to said feed supplying device by angular displacement means which comprise at least part of said weighing means, and an animal identification device for recognizing a particular animal that proceeds to said feed unit.

2. A feed metering device in accordance with claim 1, wherein said animal identification device provides data to said feed supplying device, said feed supplying device supplying an amount of feed to said feed unit based on data from said animal identification device.

3. A feed metering device in accordance with claim 2, wherein said weighing means provides data to said feed supplying device, the amount of feed provided by said feed supplying device to said feed unit being based on data both from said animal identification device and said weighing means.

4. A feed metering device in accordance with claim 1, wherein said feed unit bears on said animal identification device by means of a roll.

5. A feed metering device for providing feed in measured proportions to an animal which comprises a feed unit for containing said feed, an entrance opening to said feed unit, a feed supplying device for providing feed to said unit, and weighing means for weighing the feed in said feed unit, said feed unit being connected to said feed supplying device by angular displacement means which comprise at least in part said weighing means, said angular displacement means comprising a measuring roll which is in contact with said feed unit.

6. A feed metering device for providing feed in measured portions to an animal which comprises a feed unit for containing said feed, an entrance opening to said feed unit, a feed supplying device for providing feed to said feed unit, a safety supporting bracket for said feed unit, and weighing means for weighing the feed in said feed unit, said feed unit being connected to said feed supplying device by angular displacement means which comprise at least in part said weighing means.

7. A feed metering device for providing feed in measured portions to an animal which comprises a feed unit for containing said feed, an entrance opening to said feed unit, a feed supplying device for providing feed to said feed unit, weighing means for weighing the feed in said feed unit, said feed unit being connected to said feed supplying device by angular displacement means which comprise at least in part said weighing means, and animal identification means for identifying an animal to be deterred from appearing at said feed unit and taking feed therefrom, the feed metering device further comprising deterring means for deterring animal that appears at said feed unit from taking feed therefrom.

8. A feed metering device in accordance with claim 7, wherein said deterring means receives data from said animal identification means for deterring selected animals identified by said animal identification device from taking feed from said feed unit.

9. A feed metering device for providing feed in measured portions to an animal which comprises a feed unit for containing said feed, an entrance opening to said feed unit, a feed supplying device for providing feed to said feed unit, weighing means for weighing the feed in said feed unit, said feed unit being connected to said feed supplying device by angular displacement means which comprise at least in part said weighing means, and an animal identification device and deterring means for deterring an animal from taking feed from said feed unit, said deterring means being at least partially integrated with said animal identification device.

10. A feed metering device in accordance with claim 9, wherein said deterring means comprises a loudspeaker that produces an animal-frightening sound.

11. A feed metering device in accordance with claim 9, wherein said deterring means comprises a lighting device that emits an animal-frightening light.

12. A feed metering device for providing feed in measured portions to an animal which comprises a feed unit for containing said feed, an entrance opening to said feed unit, a feed supplying device for providing feed to said feed unit, weighing means for weighing the feed in said feed unit, said feed unit being connected to said feed supplying device by angular displacement means which comprise at least in part said weighing means, and an animal identification device which is disposed in a vicinity below said entrance opening.

13. A feed metering device for providing feed in measured portions to an animal which comprises a feed unit for containing said feed, an entrance opening to said feed unit, a feed supplying device for providing feed to said feed unit, weighing means for weighing the feed in said feed unit, said feed unit being connected to said feed supplying device by angular displacement means which comprise at least in part said weighing means, and deterring means for deterring an animal from taking feed from said feed unit, said deterring means being at least partly integrated in said weighing means.

14. A feed metering device for providing feed in measured portions to an animal which comprises a feed unit for containing said feed, an entrance opening to said feed unit, a feed supplying device for providing feed to said feed unit, and weighing means for measuring the weight of feed which is contained in said feed unit, said feed unit being connected to said feed supplying device by angular displacement means which comprises at least in part said weighing means.

15. A feed metering device in accordance with claim 14, which further comprises an animal identification device for recognizing a particular animal that proceeds to said feed unit.

16. A feed metering device in accordance with claim 15, wherein said animal identification device provides data to said feed supplying device, said feed supplying device supplying an amount of feed to said feed unit based on data from said animal identification device.

17. A feed metering device in accordance with claim 16, wherein said weighing means provides data to said feed supplying device, the amount of feed provided from said feed supplying device to said feed unit being based on data both from said animal identification device and said weighing means.

18. A feed metering device in accordance with claim 14, wherein said weighing means includes said feed unit which is pivotal about a hinge pin and a device for determining the degree of angular displacement of said angular displacement means and, based on said degree as so determined, the weight of feed present in said feed unit.

19. A feed metering device in accordance with claim 18, wherein said device for determining the degree of angular displacement of said angular displacement means is integrated with an animal identification device.

20. A feed metering device in accordance with claim 14, wherein said angular displacement means comprises a measuring roll which is in contact with said feed unit.

21. A feed metering device in accordance with claim 14, which further comprises a load sensor, said load sensor being operatively connected to said angular displacement means, said feed unit bearing on said load sensor.

22. A feed metering device in accordance with claim 21, which comprises an animal identification device, said load sensor being included in said animal identification device.

23. A feed metering device in accordance with claim 14, wherein said weighing means comprises a hinge pin, a measuring roll and a load sensor which are located in close proximity to each other.

24. A feed metering device in accordance with claim 14, which further comprises a safety supporting bracket for said feed unit.

25. A feed metering device in accordance with claim 14, wherein said feed unit is movable, said weighing means comprising said movable feed unit, a motor for moving said feed unit and for measuring the magnitude of torque during movement of said feed unit, said motor including means for deducing from the magnitude said torque as so measured the weight of the feed in said feed unit.

26. A feed metering device in accordance with claim 14, comprising an animal identification device, data as to the weight of feed in said feed unit being integrated in said animal identification device.

27. A feed metering device in accordance with claim 14, wherein said weighing means comprises a motor and a torque roll, said motor moving said feed unit and driving said torque roll, said torque roll being in contact with said feed unit.

28. A feed metering device in accordance with claim 14, which comprises animal identification means for identifying an animal to be deterred from appearing at said feed unit and taking feed therefrom, the feed metering device further comprising deterring means for deterring an animal that appears at said feed unit from taking feed therefrom.

29. A feed metering device in accordance with claim 28, wherein said deterring means receives data from said animal identification device for deterring selected animals identified by said animal identification device from taking feed from said feed unit.

30. A feed metering device in accordance with claim 14, which comprises an animal identification device and deterring means for deterring an animal from taking feed from said feed unit, said deterring means being at least partially integrated with said animal identification device.

31. A feed metering device in accordance with claim 30, wherein said deterring means comprises a loudspeaker that produces an animal-frightening sound.

32. A feed metering device in accordance with claim 30, wherein said deterring means comprises a lighting device that emits an animal-frightening light.

33. A feed metering device in accordance with claim 30, wherein said deterring means comprises an electrical current emitting device that emits an animal-frightening electrical current.

34. A feed metering device in accordance with claim 30, wherein said deterring means includes a closing means, said closing means being movable to close said entrance opening to said feed unit.

35. A feed metering device in accordance with claim 30, wherein said feed unit comprises a movable closing means which closes said entrance opening to said feed unit.

36. A feed metering device in accordance with claim 14, wherein said feed unit comprises a wall portion for catching feed in said feed unit.

37. A feed metering device in accordance with claim 14, which comprises an animal identification device for identifying animals that proceed to the feed metering device, closing means for said feed unit, a motor driving said closing means, said motor being controlled on the basis of data from said animal identification device.

38. A feed metering device in accordance with claim 37, comprising a roll which contacts said closing means, said motor driving said roll.

39. A feed metering device in accordance with claim 38, wherein said animal identification device includes said motor and said roll.

40. A feed metering device in accordance with claim 39, wherein said feed unit bears on said animal identification device by means of said roll.

41. A feed metering device in accordance with claim 14, which comprises closing means for closing said entrance opening to said feed unit and a roll for moving said closing means, said roll also measuring torque applied to said feed unit due to the weight of the food in said feed unit.

42. A feed metering device in accordance with claim 14, which further comprises an animal identification device which is disposed in a vicinity below said entrance opening.

43. A feed metering device in accordance with claim 14, comprising deterring means for deterring an animal from taking feed from said feed unit, said deterring means being at least partly integrated in said weighing means.

44. A feed metering device for providing feed in measured portions to an animal which comprises a feed unit for containing said feed, an entrance opening to said feed unit, a closing member for closing said feed unit, a feed supplying device for providing feed to said feed unit, weighing means for weighing the feed in said feed unit, said weighing means comprising a roll which is in contact with said feed unit, said roll providing data concerning the amount of feed in said feed unit, an animal identification means for identifying animals that go to said feed unit, said animal identification means selectively opening and closing said closing means for selected animals that appear at said feed unit to take feed therefrom depending on the then current nutritional status of said animal.

* * * * *